(12) United States Patent
Scott

(10) Patent No.: US 8,641,289 B2
(45) Date of Patent: Feb. 4, 2014

(54) TRIPLE-LIP SEALS FOR BEARINGS AND BEARINGS INCORPORATING THE SAME

(76) Inventor: Charles Winfield Scott, Cincinnati, OH (US)

( * ) Notice: Subject to any disclaimer, the term of this patent is extended or adjusted under 35 U.S.C. 154(b) by 172 days.

(21) Appl. No.: 13/104,409

(22) Filed: May 10, 2011

(65) Prior Publication Data

US 2012/0170884 A1    Jul. 5, 2012

Related U.S. Application Data

(60) Provisional application No. 61/430,154, filed on Jan. 5, 2011, provisional application No. 61/430,316, filed on Jan. 6, 2011.

(51) Int. Cl.
*F16C 33/78* (2006.01)

(52) U.S. Cl.
USPC .......................................... 384/486; 277/565

(58) Field of Classification Search
USPC .................. 277/353, 562, 565; 384/484, 486
See application file for complete search history.

(56) References Cited

U.S. PATENT DOCUMENTS

| | | | | |
|---|---|---|---|---|
| 3,194,571 A * | 7/1965 | Peickii et al. | .................. | 277/565 |
| 4,502,739 A * | 3/1985 | Flander | ........................ | 384/481 |
| 4,695,062 A * | 9/1987 | Dreschmann et al. | ........ | 277/353 |
| 4,726,696 A * | 2/1988 | Dickinson et al. | ............ | 384/477 |
| 4,848,776 A * | 7/1989 | Winckler | ....................... | 277/349 |
| 5,042,822 A * | 8/1991 | Dreschmann et al. | ........ | 277/353 |
| 5,133,609 A * | 7/1992 | Ishiguro | ........................ | 384/486 |
| 5,163,691 A * | 11/1992 | Lederman | ...................... | 277/551 |
| 2007/0222161 A1* | 9/2007 | Voydatch et al. | ............. | 277/551 |
| 2010/0327539 A1* | 12/2010 | Okaji et al. | .................... | 277/562 |

OTHER PUBLICATIONS

"Catalog No. 3000-7", SST Bearing Corporation, pp. 113-114.

* cited by examiner

*Primary Examiner* — Thomas R Hannon
(74) *Attorney, Agent, or Firm* — Dinsmore & Shohl LLP

(57) ABSTRACT

Sealing members for bearings and bearings incorporating the same are disclosed. A sealing member for a bearing may have a resilient axial seal extending from an outer diameter of the sealing member and a plurality of resilient sealing lips extending radially from an inner diameter of the sealing member. The sealing member may be utilized in a bearing which includes an inner race having a plurality of sealing grooves formed in an outer diameter of the inner race and an outer race including at least one sealing channel formed in an inner diameter of the outer race. The sealing member may be sealingly engaged with the inner race and the outer race such that the plurality of resilient sealing lips are sealingly engaged with the plurality of sealing grooves of the inner race and the resilient axial seal is sealingly engaged with the sealing channel of the outer race.

14 Claims, 5 Drawing Sheets

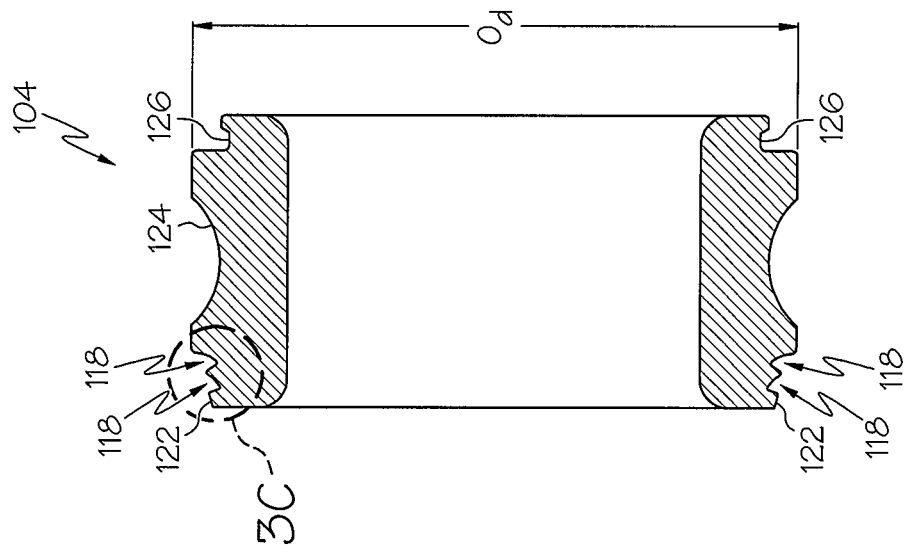
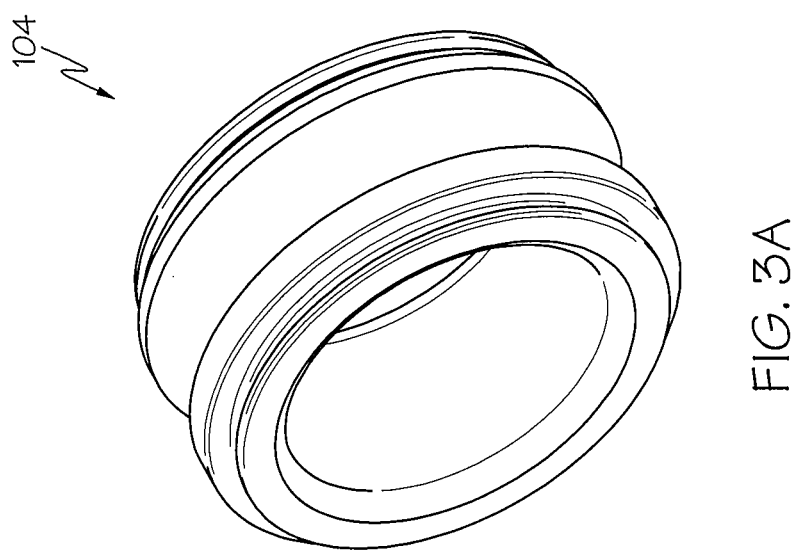
FIG. 3B
FIG. 3A

TRIPLE-LIP SEALS FOR BEARINGS AND BEARINGS INCORPORATING THE SAME

CROSS REFERENCE TO RELATED APPLICATIONS

The present specification claims priority to U.S. Provisional Application No. 61/430,154 filed Jan. 5, 2011 and entitled "Triple Lip Seals For Bearings and Bearings Incorporating the Same", the entirety of which is incorporated herein by reference, and U.S. Provisional Application No. 61/430,316 filed Jan. 6, 2011 and entitled "Triple-Lip Seals For Bearings and Bearings Incorporating the Same", the entirety of which is incorporated herein by reference.

TECHNICAL FIELD

The present specification generally relates to sealed bearings and, more specifically, to radial bearings with lip seals.

BACKGROUND

Bearings, such as radial bearings, are commonly employed in equipment and machinery and may be exposed to a wide range of environmental conditions. Accordingly, bearings are sometimes sealed. Such seals are multifunctional. For example, the seals in the bearings retain lubricants installed in the bearings during manufacture. In addition, the seals in the bearings also prevent contaminants, such as liquids and/or particulate matter, from entering the bearing and contacting the rolling elements and/or the surfaces of the bearing raceways.

Triple-lip seals have been employed in bearings to serve the aforementioned sealing function. However, existing triple-lip seal designs have several drawbacks. For example, the triple-lip seals are land-riding, meaning that the triple-lip seals are engaged with a flat surface of the outer diameter of the inner race of the bearing to form a seal. The interface between the triple-lip seal and the flat surface of the inner race often times does not adequately seal the bearing and/or the seal may be easily defeated. Furthermore, earlier triple-lip seal designs require the use of an extended inner race which provides the interface with the triple-lip seal. This extended inner race adds significant cost to the bearing in both material and equipment as significant modifications to the bearing manufacturing equipment must be made. In many cases, the machinery in which the bearing is utilized must be redesigned and/or modified to accommodate the extended inner race. Moreover, current triple-lip seal designs often utilize a metal crimp on their outer diameter which fits into the bearing outer race. However, to enable the crimping function, the metal crimps often include perforations around their circumference which allows water to leak into the bearing, thereby defeating the purpose of the triple-lip seal.

Accordingly, a need exists for alternative triple-lip seals for bearings and bearings incorporating the same.

SUMMARY

The embodiments described herein relate to bearings with improved triple lip seals to prevent water and debris from contacting the roller elements of the bearings and to prevent lubrication from exiting the raceways of the bearing. Also disclosed are sealing members with triple lip seals for use with bearings.

Some embodiments described herein relate to a bearing which includes an inner race, an outer race and a plurality of rolling elements positioned between the inner and outer races such that the inner and outer races are freely rotatable with respect to one another. The inner race includes a plurality of sealing grooves formed in an outer diameter of the inner race adjacent to the raceway of the inner race. The outer race includes at least one sealing groove formed in the inner diameter of the outer race adjacent to the raceway of the outer race. The bearing also includes a sealing member having an annular shape. The outer diameter of the sealing member is formed with a resilient axial seal. The inner diameter of the sealing member is formed with a plurality of resilient sealing lips which extend radially from the sealing member. Each of the sealing lips is constructed with a length and thickness which is different than that of an adjacent sealing lip. The sealing member also includes a shield affixed to an outboard side of the sealing member and a retaining spring affixed to an inboard side of the sealing member. The retaining spring generally extends at least partially around a central annulus at the center of the sealing member. The sealing member is positioned in the bearing such that the axial seal is engaged with the sealing groove formed in the inner diameter of the outer race and the plurality of sealing lips are engaged with the plurality of sealing grooves formed in the outer diameter of the inner race. The spring element exerts a constant pressure on the sealing lips thereby maintaining the engagement of the sealing lips with the sealing grooves of the inner race.

According to another embodiment, a bearing may include an inner race, an outer race and a sealing member. The inner race may include a plurality of sealing grooves formed in an outer diameter of the inner race. The outer race may be positioned around the inner race and includes at least one sealing channel formed in an inner diameter of the outer race. The sealing member may have an annular shape with a central annulus. A resilient axial seal can extend from an outer diameter of the sealing member while a plurality of resilient sealing lips extend radially inward from an inner diameter of the sealing member. The sealing member may be sealingly coupled to the inner race and the outer race such that at least two of the plurality of resilient sealing lips are sealingly engaged with the plurality of sealing grooves of the inner race and the resilient axial seal is sealingly engaged with the at least one sealing channel of the outer race.

According to another embodiment, a bearing may include an inner race, an outer race, a plurality of rolling elements and a sealing member. The inner race may include an inner raceway formed in an outer surface of the of the inner race, a plurality of sealing grooves formed in an outer diameter of the inner race adjacent to the inner raceway, and a sealing surface positioned outboard of the plurality of sealing grooves. The outer race is positioned around the inner race and may include an outer raceway formed in an inner surface of the outer race and at least one sealing channel formed in an inner diameter of the outer race adjacent to the outer raceway. The plurality of rolling elements may be positioned between the inner raceway and the outer raceway such that the inner race and the outer race are freely rotatable with respect to one another. The sealing member may generally have an annular shape and includes a resilient axial seal extending from an outer diameter of the sealing member. The sealing member also includes a plurality of resilient sealing lips extending from an inner diameter of the sealing member. The sealing member may be sealingly coupled to the inner race and the outer race such that at least two of the plurality of resilient sealing lips are sealingly engaged with the plurality of sealing grooves of the inner race, the resilient axial seal is sealingly engaged with the at least one sealing groove of the outer race, and at least one of the plurality of resilient sealing lips is sealingly engaged with the sealing surface of the inner race such that the rolling elements are sealed between inner race and the outer race from an outboard side of the bearing.

Some embodiments described herein also relate to a sealing member for a bearing. The sealing member is annular in shape and has an outer diameter formed with a resilient axial seal. The inner diameter of the sealing member is formed with a plurality of resilient sealing lips which extend radially from the sealing member. Each of the sealing lips is constructed with a length and/or thickness which is different than that of an adjacent sealing lip. The sealing member also includes a shield affixed to an outboard surface of the sealing member and, optionally, a retaining spring affixed to an inboard side of the sealing member. The retaining spring generally extends at least partially around the central annulus of the sealing member.

In another embodiment, a sealing member for a bearing may have an annular shape with an inner diameter, an outer diameter and a central annulus. A resilient axial seal may extend from the outer diameter of the sealing member in an axial direction while a plurality of resilient sealing lips may extend from the inner diameter of the sealing member in a radial direction. The plurality of resilient sealing lips may be spaced apart from one another in an axial direction. In some embodiments, a length and thickness of each of the plurality of resilient sealing lips may be different than the length and thickness of an adjacent sealing lip. In some embodiments, the sealing member may further include a shield at least partially extending between the outer diameter and the inner diameter of the sealing member. In still other embodiments, the sealing member may further include a retaining spring positioned around the annulus of the sealing member, the retaining spring exerting a radially outward force on the sealing member.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3A schematically depicts the inner race of the bearing of FIG. 1A;

FIG. 3B schematically depicts a cross section of the inner race of FIG. 3A;

DETAILED DESCRIPTION

Figure 1B:
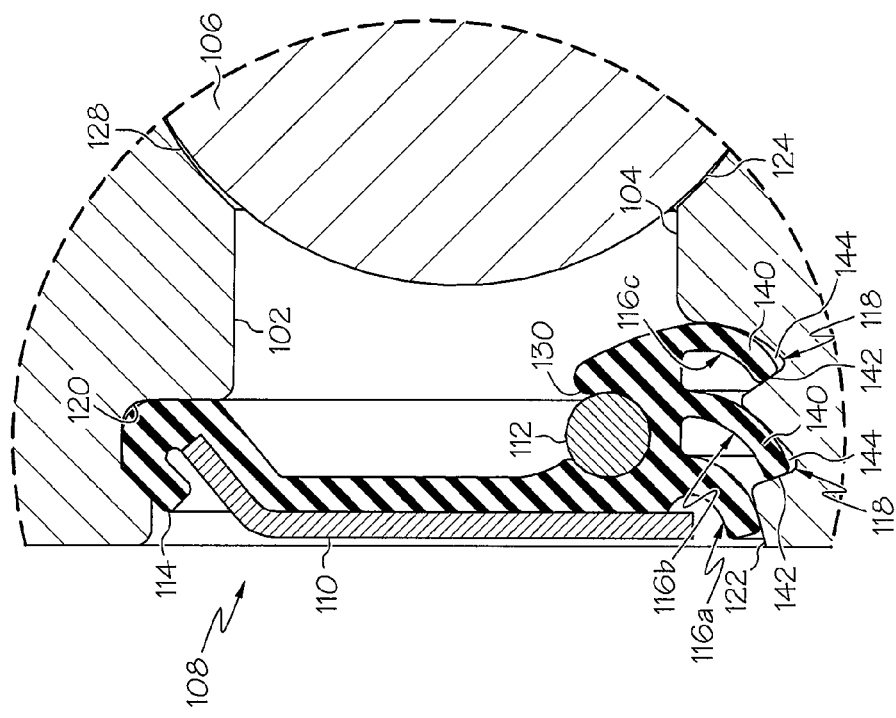
FIG. 1A schematically depicts a cross section of a bearing with a triple-lip seal according to one or more embodiments shown and described herein FIG. 1B schematically depicts an enlarged view of a partial cross section of the triple-lip seal of FIG. 1A engaged with grooves formed in the inner race.
Figure 1A:
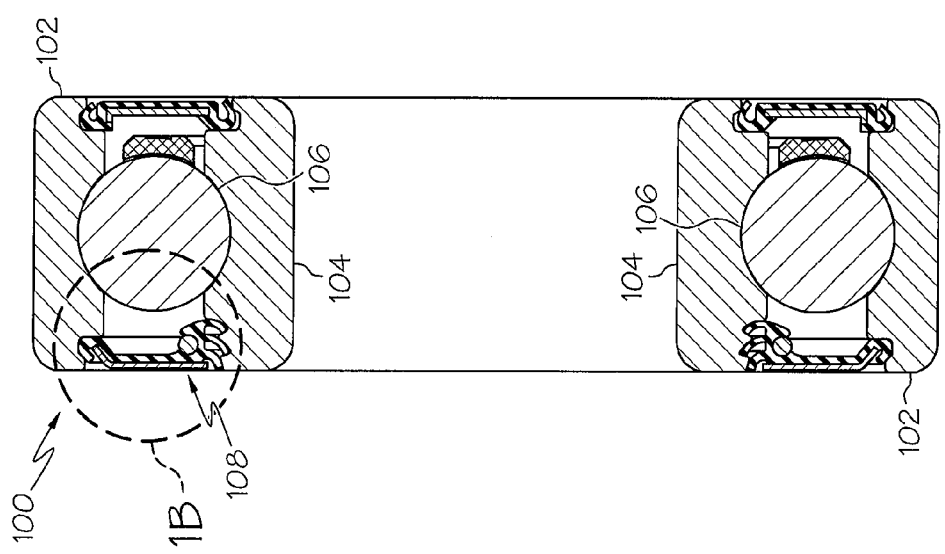

As shown in FIG. 1A, the bearings described herein generally include an inner race, an outer race, a plurality of rolling elements, and a sealing member. The sealing member is generally annular in shape and includes an outer diameter from which a resilient axial seal extends. The sealing member also has an inner diameter from which a plurality of resilient sealing lips extend in an inward radial direction. The sealing member is positioned in the bearing such that the axial seal is engaged with the sealing groove formed in the inner diameter of the outer race and the plurality of sealing lips are engaged with the plurality of sealing grooves formed in the outer diameter of the inner race. The bearing and various components of the bearing will be described in more detail herein with specific reference to the appended drawings.

Referring now to FIGS. 1A and 1B, a cross section of a bearing 100 is schematically depicted. The bearing 100 generally includes an outer race 102 and an inner race 104, a plurality of rolling elements 106 disposed between the outer race 102 and the inner race 104, and a sealing member 108 positioned on an outboard side of the bearing 100.

Figure 2:
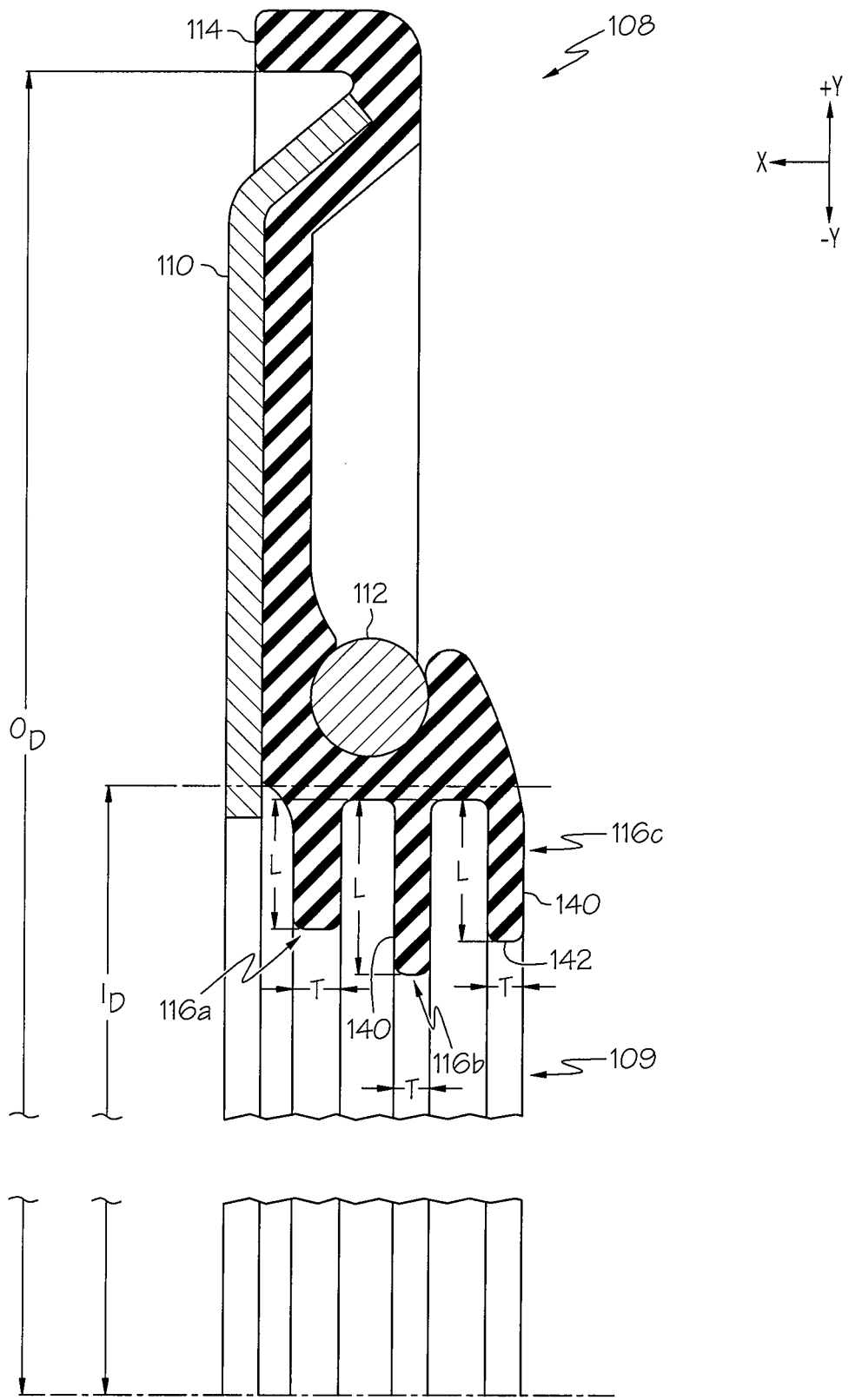
FIG. 2 schematically depicts a partial cross section of the triple-lip seal of FIG. 1 according to one or more embodiments shown and described herein.
Figure 3C:
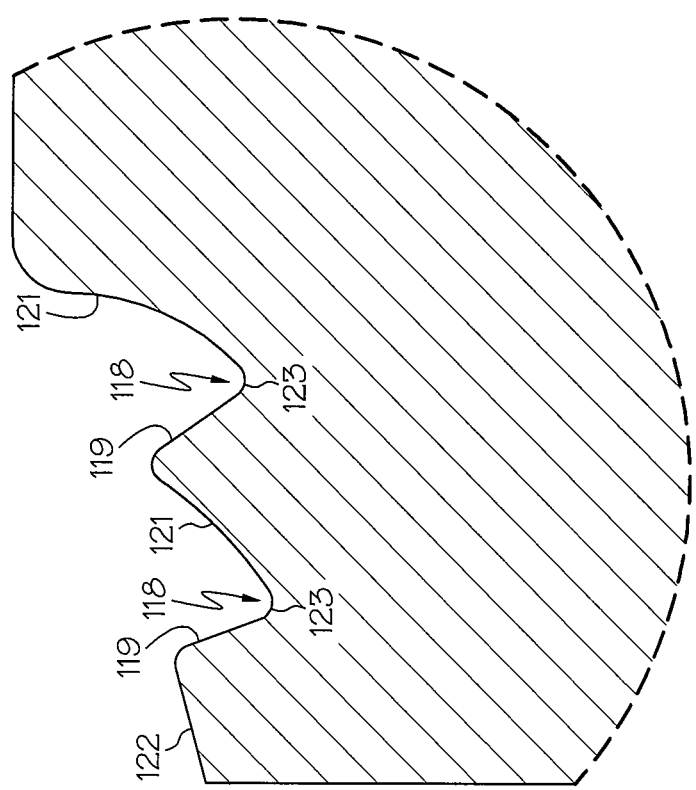
FIG. 3C schematically depicts an enlarged view of the sealing grooves formed of the inner race FIG. 3B.

Referring to FIGS. 1A and 1B and the partial cross section of the sealing member 108 depicted in FIG. 2, the sealing member 108 is formed from a polymeric material, such as NBR rubber or the like. The sealing member 108 is generally annular in shape and extends between an inner diameter $I_D$ and an outer diameter $O_D$ such that a central annulus 109 is formed in the sealing member 108, as depicted in FIG. 2. A resilient axial seal 114 extends from the outer diameter $O_D$ of the sealing member in an axial direction (i.e., the x-direction in the coordinate axes shown in FIG. 2). The inner diameter $I_D$ of the sealing member 108 is formed with a plurality of resilient sealing lips 116a, 116b, 116c which extend radially inward (i.e., in the +/−y-direction of the coordinate axes shown in FIG. 2). Each of the resilient sealing lips 116a, 116b, 116c is constructed with a length and thickness which is different than that of an adjacent resilient sealing lip.

In some embodiments, the sealing member 108 optionally includes a shield 110 affixed to an outboard side of the sealing member 108. The shield 110 may be formed from various materials including polymers, metals, metallic alloys and the like. In the embodiments described herein, the shield 110 is formed from mild steel. The shield 110 is generally annular in shape and extends between the inner diameter $I_D$ and the outer diameter $O_D$ of the sealing member 108 such that the central annulus 109 of the sealing member 108 is open. In the embodiments described herein the shield 110 may be adhesively affixed to the sealing member 108 or, alternatively, co-molded with the sealing member 108. The shield 110 provides the sealing member 108 with mechanical rigidity and also prevents the sealing member 108 from being punctured.

Still referring to FIGS. 1A-1B and 2, in some embodiments, the sealing member 108 further includes a retaining spring 112. In the embodiments shown and described herein, the retaining spring is affixed to an inboard side of the sealing member 108. In the embodiment of the sealing member 108 shown in FIGS. 1A-1B and 2 the retaining spring 112 is positioned in a retaining seat 130 formed in the inboard side of the sealing member 108 proximate the inner diameter $I_D$ and generally extends at least partially around the central annulus 109 of the sealing member. In the embodiments described herein the retaining spring 112 is circular in cross section and is constructed from an elastically resilient material such as spring steel.

While the embodiments of the sealing member 108 depicted herein have a shield 110 and a retaining spring 112, it should be understood that the shield 110 and spring 112 are optional and that, in other embodiments, the sealing member 108 may be formed without the shield 110 and/or retaining spring 112.

Referring now to FIGS. 1A and 3A-3C, the inner race 104 of the bearing 100 is generally annular and may be formed from a metallic material, such as hardened steel or the like. The inner race 104 generally includes an inner raceway 124 formed in the outer diameter $O_D$ of the inner race 104. An outboard edge of the inner race 104 is formed with a plurality of sealing grooves 118 which open radially outward. Each of the sealing grooves 118 extends around the outer circumference of the inner race 104 and is generally v-shaped in cross section with the inboard wall 121 of each sealing groove 118 having a length greater than the outboard wall 119 of the same sealingly groove. The inboard wall 121 and the outboard wall 119 of each sealing groove intersect at a nadir 123. In the embodiments of the bearing 100 shown and described herein, the inboard wall 121 of each sealing groove 118 is contoured or curved while the outboard wall 119 of each sealing groove 118 is generally flat. However, it should be understood that, in other embodiments, both the inboard and outboard walls 121, 119 of each sealing groove 118 may be flat or, alternatively, both the inboard and outboard walls 121, 119 may be contoured.

In the embodiments shown and described herein, the sealing grooves 118 have different dimensions with the inboard sealing groove slightly larger (in both width and depth) than the outboard sealing groove. The inner race 104 also includes a sealing surface 122 located outboard of the sealing grooves 118. In addition, the inboard edge of the inner race 104 is formed with a groove 126 in which an additional sealing member and/or shield may be positioned.

Figure 4B:
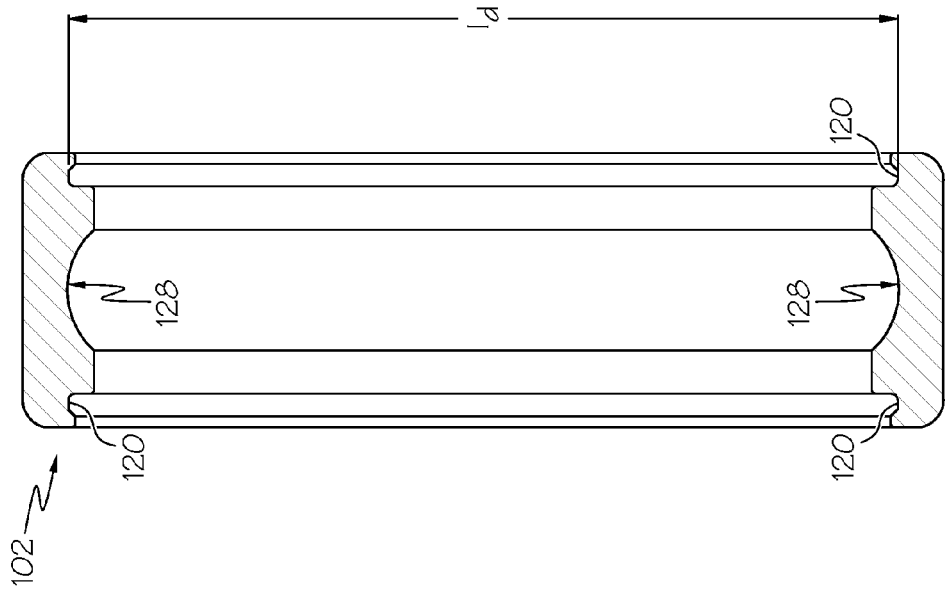
FIG. 4B schematically depicts a cross section of the outer race of FIG. 4A. including a cross section of the outer race and an enlarged view of a retaining groove formed in the outer race.
Figure 4A:
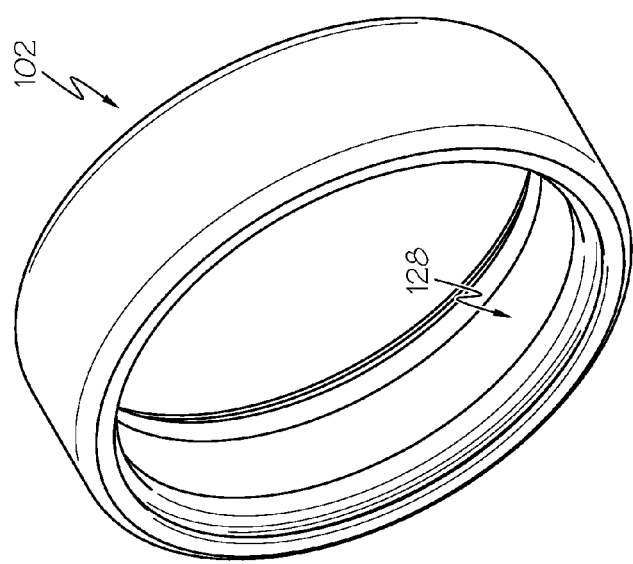
FIG. 4A schematically depicts the outer race of the bearing of FIG. 1.

Referring to FIGS. 1A and 4A-4B, the outer race 102 of the bearing 100 is generally annular and may be formed from a metallic material, such as hardened steel or the like. The outer race 102 generally includes an outer raceway 128 formed in the inner diameter $I_D$ of the outer race 102. The outboard edge of the outer race 102 is formed with a sealing channel 120 which extends around the inner diameter $I_D$ of the outer race 102. The sealing channel 120 generally opens radially inward. The inboard edge of the outer race 102 may optionally include an additional sealing channel 120 which extends around the inner diameter $I_D$ of the outer race 102, as depicted in FIG. 4B.

Referring again to FIGS. 1A and 1B, the inner race 104 is positioned within the outer race 102 and rolling elements 106 are disposed between the inner race 104 and the outer race 102 such that the rolling elements contact the outer raceway 128 formed in the outer race 102 and the inner raceway 124 formed in the inner race 104. In this manner, the inner race 104 and the outer race 102 are rotatable with respect to one another about a common axis of rotation. The sealing member 108 is positioned in the outboard side of the bearing 100 such that the resilient axial seal 114 is engaged with the sealing channel 120 formed in the outer race 102. As shown in FIG. 1B, when the resilient axial seal 114 is inserted into the sealing channel 120, the resilient axial seal 114 is deformed into a "U" shape thereby sealing the sealing member 108 to the walls of the sealing channel 120.

Similarly, at least one of the plurality of resilient sealing lips, specifically resilient sealing lip 116a, is sealingly engaged with sealing surface 122 of the inner race 104 while at least two of the plurality resilient sealing lips, specifically resilient sealing lips 116b and 116c, are engaged with corresponding sealing grooves 118 of the inner race 104. As shown in FIGS. 1A and 1B, when the resilient sealing lips 116a, 116b, 116c are engaged with the sealing grooves 118 and the sealing surface 122, the resilient sealing lips 116a, 116b and 116c are elastically deformed against the inner race 104 thereby sealing the resilient sealing lips 116a, 116b and 116c to the inner race 104. In embodiments where the sealing member 108 includes a retaining spring 112, the retaining spring 112 exerts a constant force on the resilient sealing lips 116a, 116b, 116c thereby holding the resilient sealing lips 116a, 116b, 116c in sealing engagement with the inner race 104.

The resilient sealing lips 116a, 116b, 116c are unique in that each resilient sealing lip has a different length L and thickness T than an adjacent resilient sealing lip as shown in FIG. 2. In particular, the resilient sealing lips 116b and 116c are uniquely shaped to engage with the corresponding uniquely shaped sealing grooves 118 on the outer diameter $O_D$ of the inner race 104. The inboard resilient sealing lips 116b and 116c each form a labyrinth seal in the corresponding sealing groove 118. More specifically, resilient sealing lips 116b and 116c sealingly engage with their corresponding sealing grooves 118 in two locations due to the shape of the sides of the sealing grooves 118. Specifically, the shaft portion 140 of each resilient sealing lip contacts the sealing grooves of the inner race at a first location where the elastically deformed inboard side of the resilient sealing lip is tangential to the curved inboard wall 121 of the sealing groove 118, and a second location where the tip portion 142 of the resilient sealing lip is sealingly engaged with the outboard wall 119 of the sealing groove 118. The dual points of contact resulting from the shape of the inboard walls 121 of the sealing grooves 118 forms a pocket 144 between the nadir of the sealing groove, the shaft portion 140 of the resilient sealing lip, and the inboard wall 121 of the sealing groove. In some embodiments, the pocket 140 is filled with a lubricating material, such as grease. The grease trapped in the pocket 140 acts as a barrier to external contaminants such as water, particulate matter and the like. Further, the different lengths of the inboard resilient sealing lips 116b and 116c enable the sealing member 108 to be installed in the bearing 100 without entangling or fouling thereby allowing the resilient sealing lips 116b and 116c to be properly seated and sealed in their corresponding sealing grooves 118.

Further, the outboard resilient sealing lip 116a is tangential to the sealing surface 122 in at least one location. Accordingly, the three resilient sealing lips 116a, 116b, 116c, have five distinct points of contact with the inner race 104, each of which acts as a barrier to external contaminants. Moreover, the two pockets filled with grease also act as barriers to external contaminants such that the bearing 100 has a total of seven barriers to external contaminants.

As depicted in FIGS. 1A and 1B, when the sealing member 108 is coupled to the bearing 100 the resilient sealing lips 116a, 116b and 116c are located inboard of the outboard edge of the inner race 104 (i.e., proximate to the rolling elements 106). This positioning eliminates the need for any extension of the inner race and, as such, facilitates the use of the bearing as a drop-in replacement for standard bearings, without any redesign of the equipment in which the bearing is installed.

Further, due to the positioning and configuration of the resilient sealing lips and the corresponding sealing grooves, the resilient sealing lips 116a, 116b, 116c of the sealing member 108 do not contact the rolling elements 106 even when an axial load is exerted on the inner race or outer race of the bearing.

It should be understood that the bearings described herein may be utilized in various types of devices and machinery and are particularly, though not exclusively, well suited for incorporation into devices and machinery which may be exposed to environmental conditions which necessitate sealing the bearing to prevent entry of external contaminants into the bearing.

Moreover, the axial seal 114 extending from the outer diameter of the sealing member 108 is formed of molded rubber which enables the sealing member 108 to be secured and sealed to the outer race without the use of perforated metal crimps which create potential breach points in the sealing member. More specifically, while the sealing member 108 utilizes a metal shield 110 positioned on the outboard side of the sealing member 108, the shield 110 does not extend over the axial seal 114 thus avoiding the need to crimp the shield into the outer race 102 and thereby preserving the watertight interface between the sealing member 108 and the outer race 102.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bearing comprising:
   an inner race comprising a plurality of sealing grooves formed in an outer diameter of the inner race;
   an outer race positioned around the inner race, the outer race comprising at least one sealing channel formed in an inner diameter of the outer race; and
   a sealing member having an annular shape with a central annulus, a resilient axial seal extending from an outer diameter of the sealing member, and a plurality of resilient sealing lips extending radially from an inner diameter of the sealing member, wherein at least two of the plurality of resilient sealing lips are sealingly engaged with the plurality of sealing grooves of the inner race and the resilient axial seal is sealingly engaged with the at least one sealing channel of the outer race.

2. The bearing of claim 1, wherein a length and thickness of each of the plurality of resilient sealing lips is different than the length and thickness of an adjacent sealing lip.

3. The bearing of claim 1, wherein the plurality of resilient sealing lips are spaced apart in an axial direction.

4. The bearing of claim 1, wherein the sealing member further comprises a shield at least partially extending between the inner diameter of the sealing member and the outer diameter of the sealing member.

5. The bearing of claim 1, wherein the sealing member further comprises a retaining spring positioned radially outward from the inner diameter of the sealing member, the retaining spring exerting a constant pressure on the plurality of resilient sealing lips.

6. The bearing of claim 1, wherein the resilient axial seal is elastically deformed into a u-shape in the at least one sealing channel of the outer race.

7. The bearing of claim 1, wherein each of the plurality of sealing grooves is substantially v-shaped in cross section with an inboard wall and an outboard wall intersecting at a nadir, wherein a tip portion of a resilient sealing lip is sealingly engaged with the outboard wall of a corresponding sealing groove and a shaft portion of the resilient sealing lip is sealingly engaged with the inboard wall of the corresponding sealing groove.

8. The bearing of claim 7, wherein a pocket is formed between the nadir of the corresponding sealing groove, the inboard wall of the corresponding sealing groove and the shaft portion of the resilient sealing lip.

9. The bearing of claim 8, wherein the pocket is filled with a lubricating material.

10. The bearing of claim 1, wherein:
    the inner race further comprises a sealing surface positioned outboard of the plurality of sealing grooves; and
    at least one of the plurality of resilient sealing lips is sealing engaged with a sealing surface of the inner race.

11. A bearing comprising:
    an inner race comprising an inner raceway formed in an outer surface of the of the inner race, a plurality of sealing grooves formed in an outer diameter of the inner race adjacent to the inner raceway, and a sealing surface positioned outboard of the plurality of sealing grooves;
    an outer race positioned around the inner race, the outer race comprising an outer raceway formed in an inner surface of the outer race and at least one sealing channel formed in an inner diameter of the outer race adjacent to the outer raceway;
    a plurality of rolling elements positioned between the inner raceway and the outer raceway such that the inner race and the outer race are freely rotatable with respect to one another;
    a sealing member having an annular shape, the sealing member comprising:
       a resilient axial seal extending from an outer diameter of the sealing member;
       a plurality of resilient sealing lips extending from an inner diameter of the sealing member, wherein at least two of the plurality of resilient sealing lips are sealingly engaged with the plurality of sealing grooves of the inner race, the resilient axial seal is sealingly engaged with the at least one sealing channel of the outer race, and at least one of the plurality of resilient sealing lips is sealing engaged with the sealing surface of the inner race such that the plurality of rolling elements are sealed between the inner race and the outer race from an outboard side of the bearing.

12. The bearing of claim 11, wherein each of the plurality of sealing grooves is substantially v-shaped in cross section with an inboard wall and an outboard wall intersecting at a nadir, wherein a tip portion of a resilient sealing lip is sealingly engaged with the outboard wall of a corresponding sealing groove and a shaft portion of the resilient sealing lip is sealingly engaged with the inboard wall of the corresponding sealing groove.

13. The bearing of claim 12, wherein a pocket is formed between the nadir of the corresponding sealing groove, the inboard wall of the corresponding sealing groove and the shaft portion of the resilient sealing lip, wherein the pocket is filled with a lubricating material.

14. The bearing of claim 11, wherein:
each of the plurality of resilient sealing lips are spaced apart from adjacent sealing lips in an axial direction; and
a length and thickness of each of the plurality of resilient sealing lips is different than the length and thickness of adjacent sealing lips.

\* \* \* \* \*

UNITED STATES PATENT AND TRADEMARK OFFICE
CERTIFICATE OF CORRECTION

PATENT NO. : 8,641,289 B2  
APPLICATION NO. : 13/104409  
DATED : February 4, 2014  
INVENTOR(S) : Charles Winfield Scott Page 1 of 1

It is certified that error appears in the above-identified patent and that said Letters Patent is hereby corrected as shown below:

In the Claims:

Column 8, lines 25-26, (Claim 10, line 4) "sealing engaged" is changed to "sealingly engaged"; and Column 8, line 53, (Claim 11, line 16) "sealing engaged" is changed to "sealingly engaged".

Signed and Sealed this  
Sixth Day of May, 2014

Michelle K. Lee  
*Deputy Director of the United States Patent and Trademark Office*